United States Patent [19]
Pershing

[11] 3,833,259
[45] Sept. 3, 1974

[54] VEHICLE SEAT COMPRISING THREE FOAM LAYERS

[75] Inventor: Roscoe Louis Pershing, Moline, Ill.
[73] Assignee: Deere & Company, Moline, Ill.
[22] Filed: May 30, 1972
[21] Appl. No.: 257,937

[52] U.S. Cl............ 297/452, 5/345, 5/355, 161/159, 161/190, 244/122 R, 297/195, 297/216, 297/252, 297/DIG. 1
[51] Int. Cl............ A47c 7/14, B60n 1/06
[58] Field of Search............ 161/159, 190; 297/195, 297/198, 216, 229, 252, 455, 456, 457, DIG. 1, DIG. 2, 452; 244/122 R; 5/345, 355

[56] References Cited
UNITED STATES PATENTS

| | | | |
|---|---|---|---|
| 2,981,317 | 4/1961 | Cartwright et al.......... | 297/DIG. 1 |
| 3,138,248 | 6/1964 | Abbott.................. | 297/DIG. 1 |
| 3,573,153 | 3/1971 | Ryan................... | 161/159 |
| 3,607,601 | 9/1971 | Milam et al.............. | 161/159 |

OTHER PUBLICATIONS
"Application of a Biodynamic Model to Predict Spinal Injuries from use of Aircraft Ejection Seats" by James W. Brinkley.

Primary Examiner—George F. Lesmes
Assistant Examiner—Lorraine T. Kendell

[57] ABSTRACT

A vehicle seat comprises three layers of polymer foams, the upper and lower layers being polyurethane and the center layer being polyethylene. The thicknesses and deformation characteristics of the layers of foam are optimized for a given overall seat thickness range so as to interact with an injury model correlating the deformation characteristics of the human spine such that deformation and hence injury to the spine, occasioned by the impacting of the rider's upper torso upon the seat, will be minimized. A procedure of evaluating a seat in order that the deformation characteristics of the seat may be optimized is set forth.

7 Claims, 7 Drawing Figures

FIG. 3
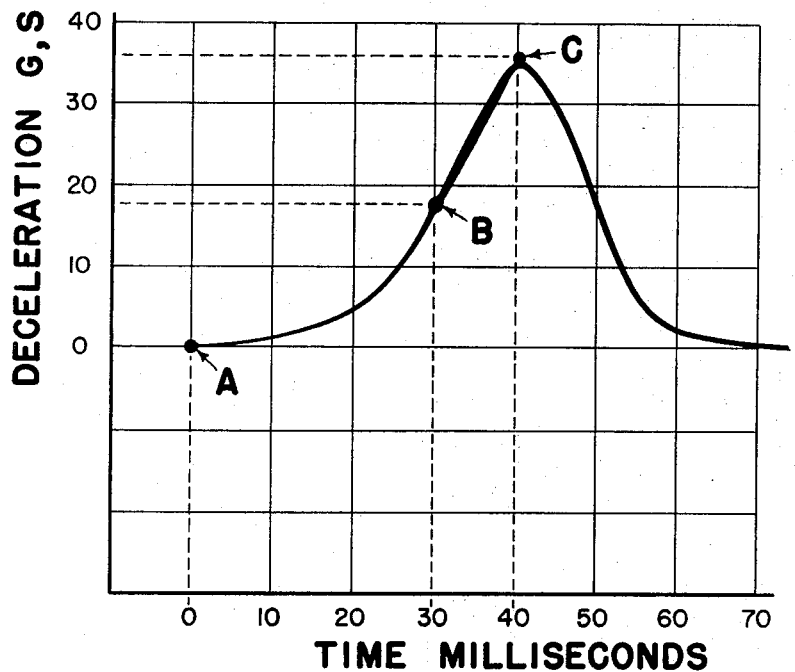
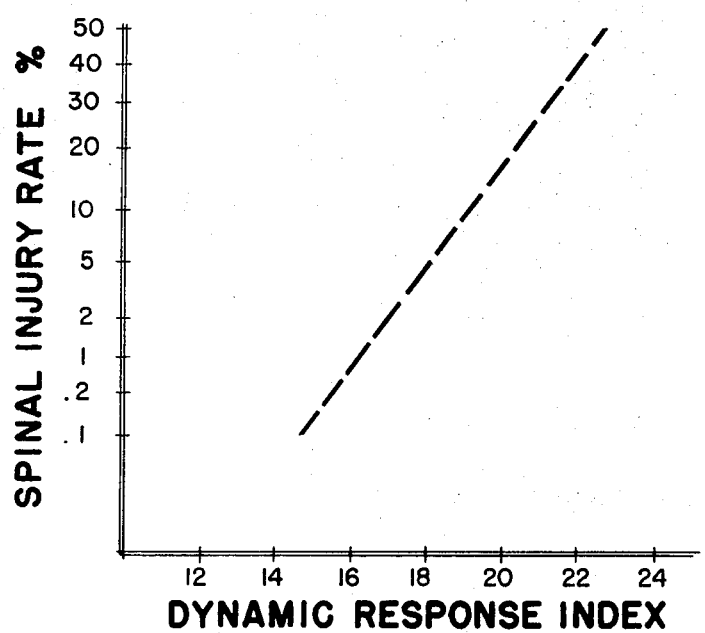
FIG. 4
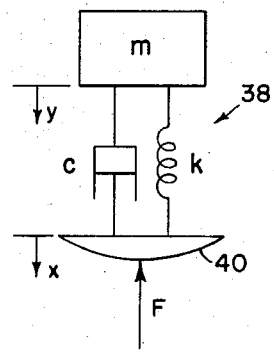
FIG. 5

FIG. 6
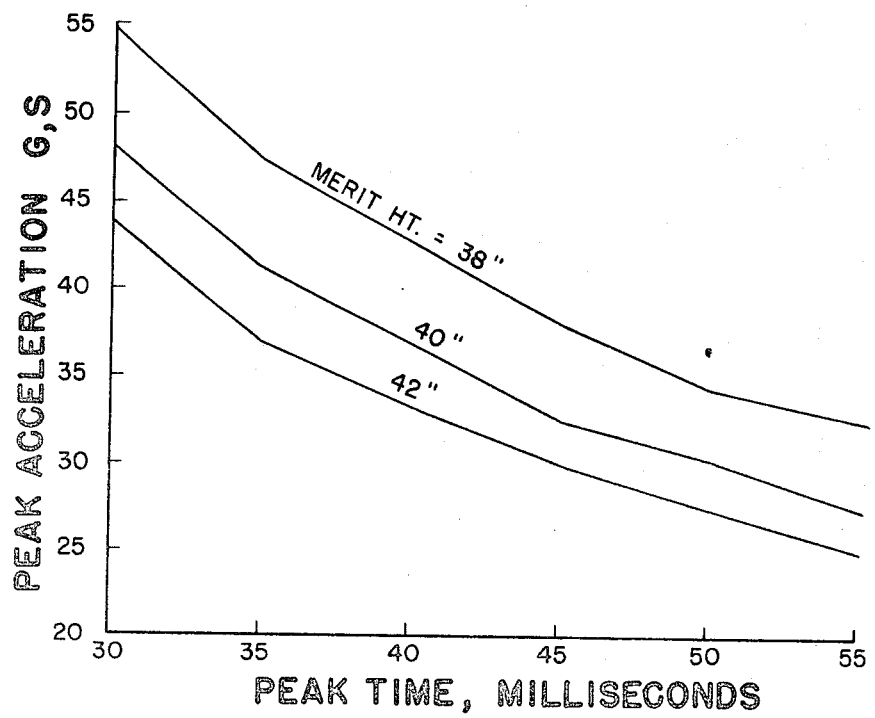
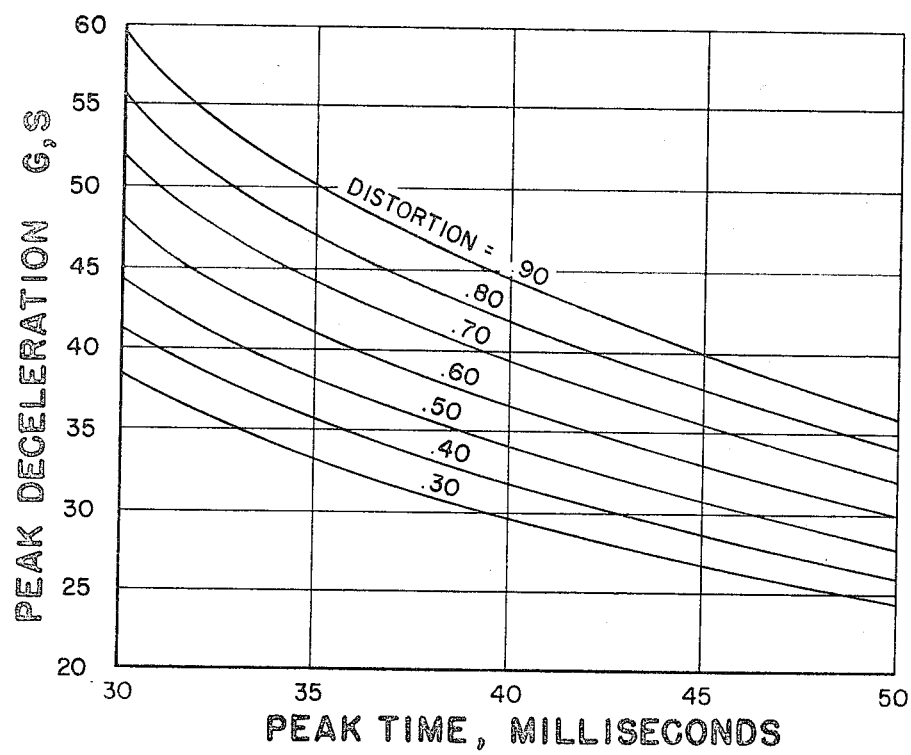
FIG. 7

VEHICLE SEAT COMPRISING THREE FOAM LAYERS

BACKGROUND OF THE INVENTION

The present invention relates to a vehicle seat and more particularly relates to a seat which is constructed of specific cushioning materials which together exhibit dynamic cushioning properties which are compatible with dynamic cushioning properties of the human spine from the standpoint of preventing injury to the spine of a rider when the rider impacts the seat.

Many vehicles, such as snowmobiles or the like, are operated off the road across terrain whereat hidden holes, rocks, logs and other such obstacles are located. Oftentimes, these vehicles encounter such obstacles resulting in impact forces being transferred from the ground-engaging means to the frame and thence to the vehicle seat. In the past, many spinal injuries have occurred as a result of these impact forces due to the fact that the cushioning materials of the seat were inadequate to damp the impact forces to the extent necessary for toleration by the human spine.

While a safe vehicle seat would probably result from increasing the thicknesses of the cushioning materials of most seats, this solution is not practical because the maximum thickness of a seat is usually dictated by the geometry of the vehicle. Even if seat thicknesses could be altered as desired, the designer would still more or less be guessing at how thick a seat should be constructed from a given material to be safe. This is because that heretofore the designer has not had any meaningful way to interrelate the dynamic cushioning properties of seat cushion materials with the dynamic cushioning properties of the human spine relative to predicting possible injury to the spine.

The U.S. Air Force in working with the problem of spinal injuries caused by aircraft ejection seat systems developed an injury model from which the possibility of injury could be predicted for a given impact system. A summary of the Air Force work is set forth in a publication entitled, "Application of a Bio-Dynamic Model to Predict Spinal Injuries From Use of Aircraft Ejection Seats" by James W. Brinkley presented at the ASC Science and Engineering Symposium, Oct. 5–7, 1971, the publication being available at the Aerospace Medical Research Laboratory at Wright Patterson Air Force Base, Ohio. While the Air Force work sets forth the concept of using an injury model for predicting spinal injury, no attempt was made there to apply the use of the model for designing vehicle seats.

SUMMARY OF THE INVENTION

According to the present invention, there is provided a seat including a cushion comprising top and bottom layers of polyurethane foam and a center layer of polyethylene foam, the layers of foam together exhibiting dynamic cushioning properties which are such as to minimize the chance of injury to the spine of a rider whose lower torso impacts the seat.

It is an object to provide a seat having such a multi-layered cushion, the layers each being of such thickness, formulation and density and being so arranged that, for any overall seat thickness, the seat exhibits dynamic cushioning properties for preventing abnormal impact loads from being transferred to the operator's spinal column. Specifically, it is an object to provide such a layered seat wherein the thicknesses and densities of the layers for any overall seat thickness are chosen such that the dynamic deformation characteristics of the seat interact with those of the human spine such that the deflection of the seat is maximized while the deflection of the spine is minimized for any given total system deflection.

A further object is to provide such a multi-layered seat wherein the polyurethane layers are formulated so as to maximize their damping characteristics.

Still another object is to provide a procedure by which the dynamic cushioning properties of a seat can be evaluated relative to its ability to interact with the dynamic cushioning properties of the human spine so as to minimize the deflection of the spine for a given level of impact.

These and other objects will become apparent from the following description and the appended drawings.

BRIEF DESCRIPTION OF THE DRAWINGS

FIG. 3 is a view showing a typical deceleration-time trace obtained by impacting a missile on a seat cushion made of foam material.

FIG. 4 is a view showing a spinal injury model for simulating the human spine during impact.

FIG. 5 is a view showing a chart relating the probability of spinal injury to axial spinal deflection.

FIG. 6 is a view showing one form of evaluation plot showing a family of curves representing seats having different abilities to absorb impact loads.

FIG. 7 is a view showing another form of evaluation chart showing a family of curves which are representative of dynamic deformation characteristics of typical safe seats.

DESCRIPTION OF THE PREFERRED EMBODIMENT

Figure 1:
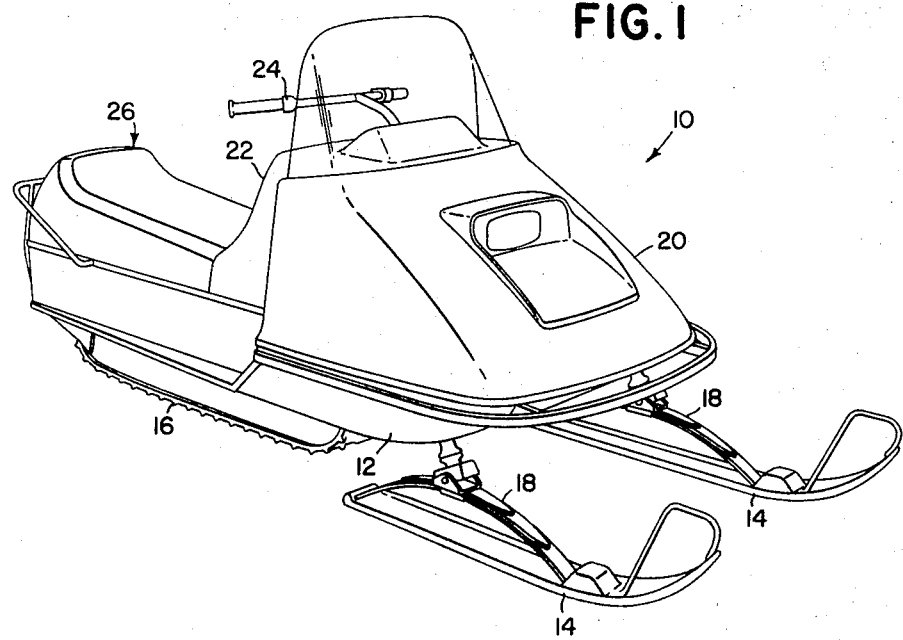
FIG. 1 is a perspective view of a snowmobile embodying a seat constructed according to the principles of the present invention.
Figure 2:
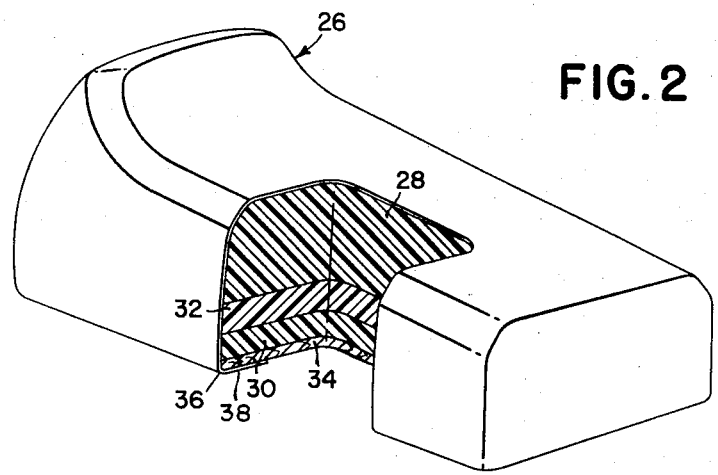
FIG. 2 is an enlarged perspective view of the seat shown in FIG. 1 with a portion of the seat being cut away to expose the layered construction thereof.

Referring now to FIG. 1, there is shown a snowmobile 10, which is typical of the vehicles on which the present invention is particularly useful.

The snowmobile 10 includes a main frame 12 which is supported on ground-engaging means comprising a pair of forwardly extending steerable skis 14 and an endless driven track 16. The skis 14 are connected to the frame 12 through means including leaf springs 18 and the track 16 is connected to the frame 12 through means of sprung bogie wheel suspensions (not shown).

A hood 20 is located on the front end of the frame 12 and encloses elements including a portion of an engine (not shown), the remainder of the engine being enclosed in a compartment defined by a housing 22 located behind the hood. Handlebar steering controls 24 project upwardly from the compartment 22 to a position to be easily grasped by an operator seated in a seat 26 extending to the rear end of the frame 12 from the rear wall of the compartment 22. The upper surface of the seat 26 slopes upwardly from front to rear in order that short as well as tall operators may position themselves in a convenient, natural position to operate the controls, the portion of the seat located centrally between its opposite ends being that which is most suited for an operator of average height.

During operation, portions of the impact loads imposed on the skis and/or the track are more or less transferred directly to the seat 26, via the frame 12, and that portion of these transferred loads not absorbed by the seat are in turn transferred to the lower torso of an operator seated in the seat. Some of these loads may be quite large, as when the vehicle "jumps" over a knoll or traverses rocks or logs or the like hidden in the snow, and it is clear that if the operator is to escape injury the seat must be constructed such as to absorb the impact loads to the extent that the unspent load transferred to the operator can be tolerated by the operator's spine.

Accordingly, the seat 26 is constructed so as to exhibit dynamic cushioning properties which complement the cushioning properties of the spine so as to prevent injury to the latter. Specifically, the seat 26 is of a multi-layer construction comprising top and bottom layers of open-cell polyurethane foam 28 and 30, respectively, separated by an intermediate layer of closed-cell polyethylene foam 32. The bottom layer of foam 30 rests on a plywood board 34 having a plurality of "breather" holes (not shown) therein, the layers of foam and the edge of the board being encased in a thin vinyl cover 36 having an edge portion 38 fixed to the bottom of the board. The two lower layers of foam are made of constant thickness, the top surface of the upper layer being sloped to provide the sloped upper seat surface for the purpose previously mentioned.

Critical to the performance of the seat 26 are the thickness, the spring and damping characteristics and the densities of each of the layers of foam and the overall or composite thickness of the layers of foam. While the spring and damping characteristics of the urethane foam are in some measure interrelated with its density (the spring and damping characteristics respectively decrease and increase as the density decreases), the spring and damping characteristics can to some extent be controlled through the formulation of the foam. Through testing, in a manner to be presently described, it has been found that the composite seat, in the embodiment to be presently described, manifests a time history of energy absorption which is matched to the energy-absorbing history of the human body in such a way as to minimize spinal injury if: (a) the polyethylene foam layer has a density of about 2 lb./ft.$^3$ and (b) the two layers of polyurethane foam have a density of about 3 lb./ft.$^3$ and are formulated with a ratio of isocyanate to the hydroxy-group containing reactant such as to maximize the damping characteristic of the resultant foam.

Typical characteristics of the polyurethane foam and of the polyethylene foam which give some indication of their respective resistances to compression, as determined by SAE recommended practice SAE J815 for the year 1972, are as follows:

| Polyurethane | |
|---|---|
| indentation load deflection | 33lbs./50in.$^2$ |
| compression set | 2% |
| Polyethylene | |
| compression-deflection | 300lbs./50in.$^2$ |
| compression set | 10% |

Most known vehicle geometries are such that the cushions of seats used thereon can be no more than ten inches thick and with this limitation in mind, it has been determined that an acceptable seat can be constructed of the above-described foams if: (a) the composite or overall thickness of the layers of foam is no less than four inches nor no more than ten inches, (b) the thickness of the center layer of foam is between 10 and 25 percent of the overall thickness (the percentage increasing as the overall thickness decreases), (c) the center layer of foam is placed in the bottom 60 percent of the overall thickness, and (d) the bottom layer of foam is at least three-fourths of an inch thick. It has been found that a seat constructed according to the above items a–d is even more acceptable if the thickness of the center layer of foam is no greater than two-and-one-half inches and the thickness of the top layer of foam is at least four inches, and that preferably, the overall thickness of the foam layers should be between six to eight inches with the thickness of each of the center and bottom layers being between one and one-and-one-half inches and with the center layer of foam being placed in the bottom half of the overall thickness.

The above-described construction of the seat was arrived at through means of a unique evaluating procedure which takes into account the dynamic cushioning properties of both the seat being tested and of the human spine and the interaction of these properties during impact. More specifically, the procedure makes use of the results of a dynamic drop test in conjunction with data developed by the Air Force when studying the problem of spinal injuries resulting during ejection, as set forth in the above-mentioned Brinkley report, for predicting the probability of injury for a given impact load.

When a foam cushion seat is subjected to an impact test, typically, a deceleration-time trace, such as that illustrated in FIG. 3, is yielded. While the velocity and deflection data necessary for evaluating the cushioning properties or force character of a seat can be found by digitizing and integrating the data of the deceleration-time trace, such a procedure is quite tedious. It has been found that the typical deceleration-time trace can be closely approximated by the use of a curve which is well defined mathematically. Specifically, it has been found that a distorted haversine, having the following equation, can be used effectively:

$$\ddot{y} = -(G \max/2) [1 - \cos (2\pi t/\tau)],$$

where $\tau = 2\tau_p [1 + E \sin (\pi t/\tau_p)]$ for $0 \leq t \leq \tau_p$, and $\tau = 2\tau_p [1 - E \sin\{ \pi(t - \tau_p)/(\tau_p(1 + EE))\} ]$ for $\tau_p \leq t \leq 2\tau_p$, where:

$EE = E/(1 + E)$, $t_p$ = time duration of pulse to peak (sec.), $t$ = haversine time duration, (sec.), $E$ = distortion in the period at the quarter point and $G \max$ = peak value of deceleration (G's).

The time duration for a true haversine to reach one-half of its peak is one-half of the time duration required to reach its peak. Therefore, the distortion of the haversine required to fit it to any given deceleration-time trace can easily be determined from the trace by solving the following equation:

distortion = $(2t_h - t_p)/t_p$, where
- $t_h$ = time duration required for trace to reach one-half of its peak and
- $t_p$ = time duration required to reach its peak.

The data points from a fitted distorted haversine and its integrals are used according to the evaluation procedure to select parameters of a seat cushion force model or equation as follows:

$$F = k_1 x + k_2 x^p + c_1 x \dot{x},$$

where
- $F$ = force (lb.)
- $x$ = deflection (in.)
- $\dot{x}$ = velocity of deflection (in./sec.) and The parameters $k_1$, $k_2$, $c_1$ and $p$ are determined from the data points of the displacement and velocity functions obtained from the integrals of the fitted distorted haversine deceleration-time trace.

Once the force character of the cushion under test is adequately known, the cushion force equation, according to the procedure, is used together with an injury model 38 (FIG. 4) and a graph (FIG. 5) based on those appearing and described in the aforementioned Brinkley publication to complete the evaluation of the seat. The injury model 38 represents the lower torso of a man and includes a bearing profile or interface form 40, the shape and size of which is chosen such that, when a seat is indented by the form, the force distribution will be close to that which would occur when the seat is indented by the buttocks of a rider. Thus, the seat imparts a force F to the bearing profile 40 of the model.

As is more fully explained below, the incidence of injury due to impacts varies with the maximum deflection induced in the model for any given input force. This maximum deflection may be calculated by solving the following differential equations:

$$0 = \ddot{y} + 2\epsilon\omega_n\dot{\delta} + \omega_n^2\delta$$

and $$F = c\dot{\delta} + k\delta,$$

where
- $\omega_n$ = natural frequency of human body tissue (rad./sec.),
- $c$ = damping coefficient (lb.-sec./in.),
- $\delta = y - x$ = the relative deflection (in.) between the base plate 40 and mass $m$ (FIG. 4),
- $k$ = spring constant (lb./in.),
- $\epsilon$ = damping ratio of human body tissue,
- $\ddot{y}$ = acceleration of the mass and
- $F$ = force transmitted to model (lb.).

According to the Brinkley publication, the tissues of the average 27.9 year old man have a damping ratio of 0.224 and a natural frequency of 52.9 rad./sec. These values are adopted here and the "average" human spine mentioned hereinafter is considered to have these characteristics.

The dynamic response index (DRI) appearing on the graph in FIG. 5 for correlating the probability of injury with axial spinal deflection is calculated by solving the following equation:

$$DRI = \omega_n^2 \,\delta max/g \text{ where,}$$
$$g = 386 \text{ in./sec.}^2.$$

In order to use this graphed information in the evaluation procedure, a maximum permissable probability of injury is chosen. For example, if it is desired to evaluate a seat by finding the height of drop of the injury model 38 at which a deflection corresponding to a five percent probability of injury would occur, it is necessary only to simulate dropping the injury model onto a seat cushion, of which the force-transmitting character has already been determined, from increasing heights until the dynamic response index (DRI) reaches the level of 18.0, which corresponds to the five percent injury level. This height of drop becomes the "figure of merit" for that seat. The figures of merit of various seats can then be compared to determine which of the seat cushion designs is the most effective. Thus, the data presented by the graph in FIG. 5 lends itself to being used to provide a basis for comparing various seats.

Accordingly, in the foregoing procedure, a maximum permissible probability of injury is always selected as a starting point, and from there the maximum deflection which can be tolerated in the spinal injury model is calculated. Dynamic drop tests are then actually performed on a seat being evaluated to determine its dynamic force characteristic, via the deceleration-time trace obtained, and calculations made to determine the effectiveness of the seat in cushioning simulated impacts of the spinal injury model. An effective way to quickly evaluate a given seat from the data which can be readily observed from considering only the actual deceleration-time trace of a given seat has been found.

Specifically, by selecting certain conditions, a large number of theoretical seats can be "evaluated" based on the foregoing procedure and data can be taken from these evaluations to yield charts, which charts can be entered, to evaluate a seat by knowing only the values of distortion, peak deceleration and peak time as are easily obtainable from the actual deceleration-time trace of the seat being evaluated.

One form of chart is illustrated in FIG. 6. The curves shown there were constructed by plotting time and deceleration data, the data values representing those of a known missle as determined from a number of simulated impacts from a fixed height on a number of theoretical seats assumed to have deceleration-time traces represented by haversines having a distortion of 0.40 and to have merit heights of 38, 40 or 42 inches and wherein a probability of five percent injury was selected, the three curves in the chart respectively resulting from three sets of computations using the different merit heights. More curves may be desired and these can be constructed by selecting additional merit heights. Also, since all actual seats do not yield deceleration-time traces to which a haversine having a distortion of 0.40 can be fitted, additional charts containing curves plotted from data obtained from theoretical seats assumed to have deceleration-time traces represented by haversines having different distortions are necessary. An actual seat can then be evaluated by impacting it with the known missle from the given height to obtain a deceleration-time trace from which its representative distorted haversine can be determined. The distortion value is then used to choose the chart which is based on the same or approximate distortion value. The peak acceleration and peak time is then obtained from the deceleration-time trace and the chosen chart is entered at the corresponding coordinate to determine the merit height or approximate merit height of the seat being evaluated.

Referring to FIG. 7, there is illustrated another example of an evaluation chart. This chart differs from that illustrated in FIG. 6 only in that instead of the curves therein being constructed from data obtained by preselecting various merit heights for each of several theoretical seat sets and respectively assigning haversines having different distortions for representing the deceleration-time traces of the theoretical seats in each of the sets, the curves are constructed by preselecting a fixed merit height for all of the theoretical seats in the seat sets. In the illustrated chart, a merit height of 40 inches is chosen and seven different distortion values (0.30 to 0.90 in increments of 0.10) are chosen to construct seven curves, as is apparent from the chart. Since the merit height is fixed, the seven curves represent seats which are all equally suitable for providing adequate cushioning for preventing the incidence of spinal injury from exceeding the five percent probability chosen. Therefore, this chart is especially adapted for use in determining whether an actual seat meets the standard represented by the curves. For example, suppose a drop test is performed on an actual seat and it yields a deceleration-time trace from which it is determined that: the peak deceleration (G max) equals 34 G's; the time duration to reach the peak ($t_p$) equals 40 milliseconds and the time duration ($t_h$) for the data pulse to reach one-half its peak equals 30 milliseconds. The distortion is then found to be 0.50 by solving the equation:

distortion = $(2t_h - t_p)/t_p$

Next 35 G's at 40 milliseconds is plotted on the chart. It is observed that the data point falls on the 0.50 distortion curve. Therefore, the seat meets the performance criteria represented by the 0.50 distortion curve. If G max had been above 34 G's at the same peak time, the data point would have been located above the 0.50 distortion line and the seat would have failed to meet the criteria. On the other hand, all seats yielding a maximum deceleration below 34 G's at a peak time of 40 milliseconds would meet the criteria since their associated data points would fall below the 0.50 distortion line.

It can thus be appreciated that the above-described procedure and charts can be used to evaluate any seat which when subjected to an impact test, will yield an acceleration-time trace to which a distorted haversine can be closely fitted. Further, it can be appreciated that through use of the foregoing procedure, applicants have been able to construct a seat which exhibits the dynamic cushioning properties necessary to substantially prevent spinal injury while keeping within the overall seat thickness dictated by the vehicle geometry.

I claim:

1. A vehicle seat comprising: top and bottom layers of open cell polyurethane foam having a density of approximately three pcf and exhibiting an indentation load deflection characteristic requiring approximately 30 lbs./50 in.$^2$, to deflect a sample thereof through 25 percent of its thickness, as determined by SAE recommended practice, SAE J815 for the year 1972; said top and bottom layers sandwiching a center layer of closed-cell polyethylene foam having a density of approximately two pcf and exhibiting an indentation load deflection characteristic requiring approximately 300 lbs./50 in.$^2$, to deflect a sample thereof through 25 percent of its thickness, as determined by said SAE recommended practice; the composite thickness of said layers of foam being no less than four inches nor more than ten inches, said center layer of foam having a thickness between 10 and 25 percent of said composite thickness and being placed in the bottom 60 percent of said composite thickness and said bottom layer being at least three-fourths of an inch thick.

2. The vehicle seat defined in claim 1 wherein the composite thickness of said layers of foam is between four and six inches and the thickness of said center layer of foam is between 20 percent and 25 percent of the composite thickness.

3. The vehicle seat defined in claim 1 wherein the composite thickness of said layers of foam is between six and eight inches, the thickness of said center layer of foam is between 15 and 20 percent of the composite thickness, and the thickness of the bottom layer of foam is at least one inch.

4. The vehicle seat defined in claim 3 wherein the thickness of said top layer of foam is at least four inches.

5. The vehicle seat defined in claim 1 wherein the composite thickness of said layers of foam is between eight and ten inches, the thickness of said center layer of foam is between 10 and 15 percent of the composite thickness, the bottom layer is at least one inch thick and the top layer of foam being at least four inches thick.

6. The vehicle seat defined in claim 1 wherein the composite thickness of the layers of foam increases from the front to the rear of the seat; said bottom and center layers of foam each being of a constant thickness.

7. The vehicle seat defined in claim 6 wherein the composite thickness of the layers of foam at a central portion intermediate the front and rear of the seat is between five and seven inches.

* * * * *